United States Patent
Sakurai et al.

(10) Patent No.: US 7,487,536 B2
(45) Date of Patent: Feb. 3, 2009

(54) APPARATUS AND METHOD FOR APPLYING REVISION INFORMATION TO SOFTWARE

(75) Inventors: Hideki Sakurai, Kawasaki (JP); Kazuhiko Migita, Kawasaki (JP); Kazuki Shimojima, Kawasaki (JP); Eiichi Nagahama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 10/809,370

(22) Filed: Mar. 26, 2004

(65) Prior Publication Data

US 2005/0066023 A1    Mar. 24, 2005

(30) Foreign Application Priority Data

Sep. 19, 2003  (JP)  ............................. 2003-329007

(51) Int. Cl.
*H04L 9/32*  (2006.01)
(52) U.S. Cl. ......................................................... 726/4
(58) Field of Classification Search ................... 726/21, 726/3–5, 17, 19; 717/120–122; 707/203, 707/104.1; 382/100; 709/222, 242, 224–225; 713/152, 166; 380/201; 705/50–51, 57, 705/80; 715/219, 227
See application file for complete search history.

(56) References Cited

U.S. PATENT DOCUMENTS

| 6,014,651 | A  | * | 1/2000  | Crawford ..................... 705/400 |
| 6,385,768 | B1 | * | 5/2002  | Ziebell ......................... 717/121 |
| 6,647,125 | B2 | * | 11/2003 | Matsumoto et al. .......... 382/100 |
| 7,155,462 | B1 | * | 12/2006 | Singh et al. ................. 707/203 |

FOREIGN PATENT DOCUMENTS

| JP | 9-81479    | 3/1997 |
| JP | 10-320184  | 12/1998 |
| JP | 2000-10766 | 1/2000 |
| JP | 2002-366379 | 12/2002 |

OTHER PUBLICATIONS

Japanese Patent Office Notice of Rejection Grounds, mailed Nov. 28, 2006, and issued in corresponding Japanese Patent Application No. 2003-329007.

* cited by examiner

*Primary Examiner*—Thanhnga B Truong
(74) *Attorney, Agent, or Firm*—Staas & Halsey LLP

(57) ABSTRACT

In a system that dynamically assigns software to a plurality of servers to perform customer services, an index to which there have been integrated the newness of a customer's software and the security level of the software is calculated, and whether the calculated index satisfies restricting conditions is checked. If the calculated index does not satisfy the restricting conditions, revision information is applied to the software.

7 Claims, 23 Drawing Sheets

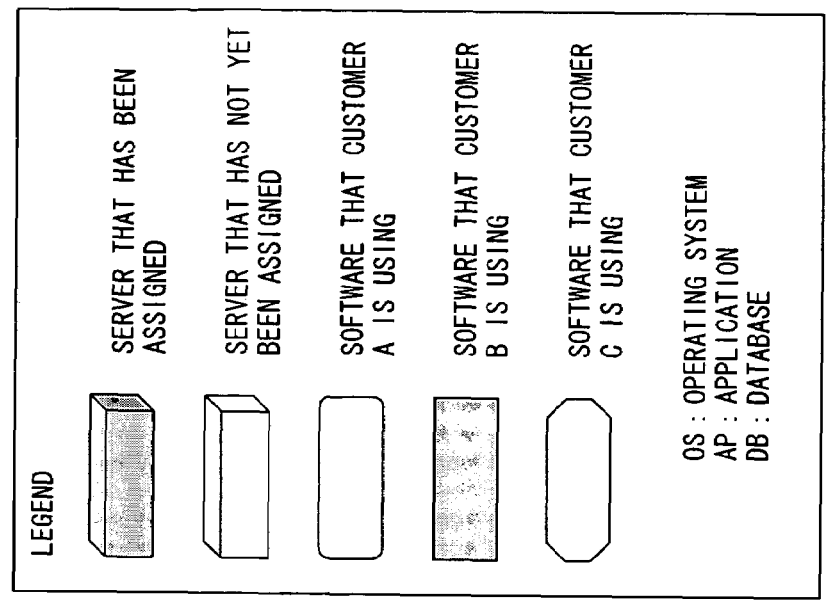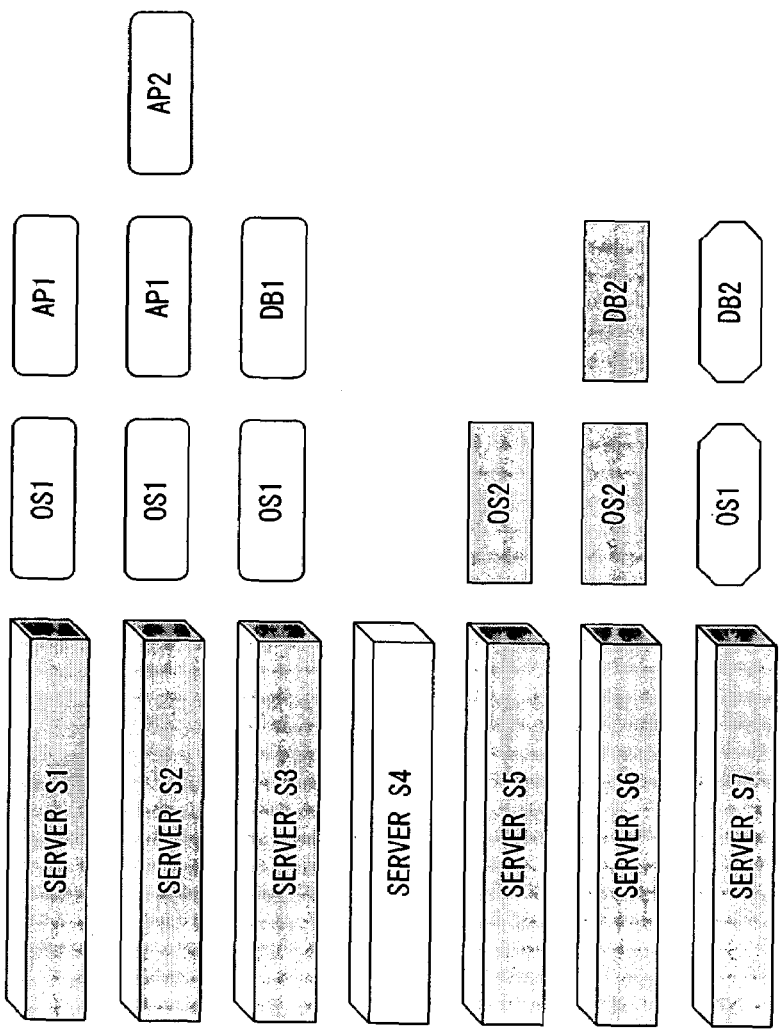
FIG. 1

| CUSTOMER NAME | SOFTWARE NAME | VERSION RESTRICTING CONDITIONS | CL RESTRICTING CONDITIONS |
|---|---|---|---|
| USER 1 | Software 1 | NIL | 85 OR MORE |
| USER 1 | Software 2 | NIL | 90 OR MORE |
| USER 1 | Software 3 | 1.3 | 70 OR LESS |
| USER 2 | ... | | |

F I G. 7

| SERVER NAME | CUSTOMER NAME | NAME OF INSTALLED SOFTWARE | VERSION |
|---|---|---|---|
| S1 | USER 1 | Software 1 | 1.3 |
| S1 | USER 1 | Software 2 | 5.2 |
| S2 | NIL | Software 1 | 1.3 |
| S3 | USER 2 | Software 3 | 3.3 |
| . . . | | | |

FIG. 8

| | SOFTWARE NAME | SERVER NAME | VERSION | CL |
|---|---|---|---|---|
| 901 | Software 1 | S1 | 1.3 | 70 |
| 902 | Software 1 | S2 | 1.4 | 80 |
| 903 | Software 1 | S3 | 1.5 | 100 |
| 904 | Software 2 | S2 | 5.3 | 89 |
| | . . . | | | |

F I G. 9

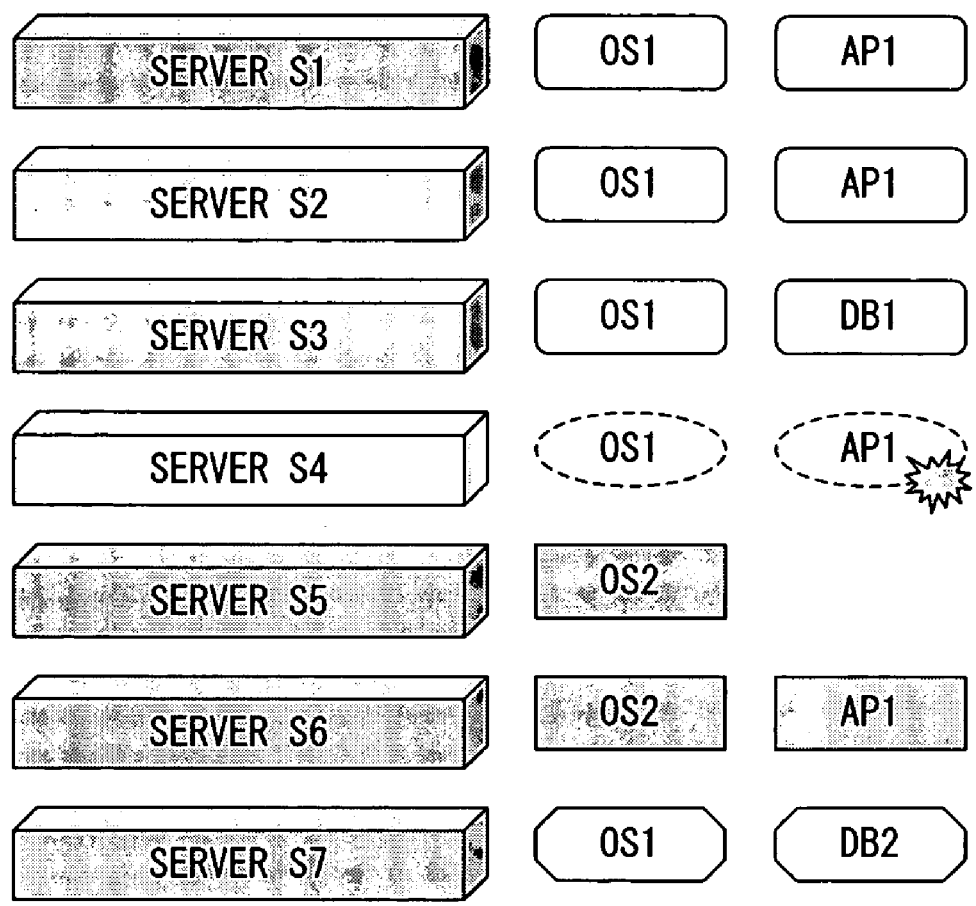
F I G. 1 2

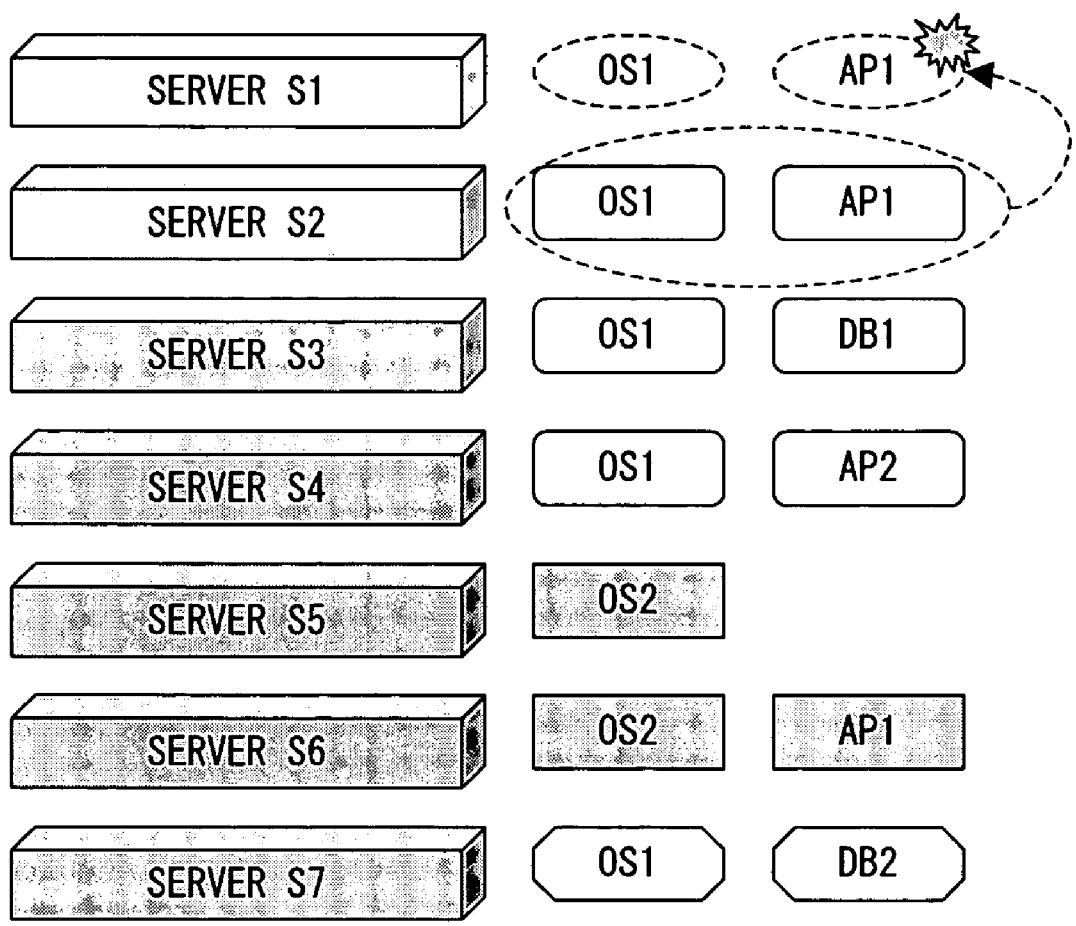
F I G. 14

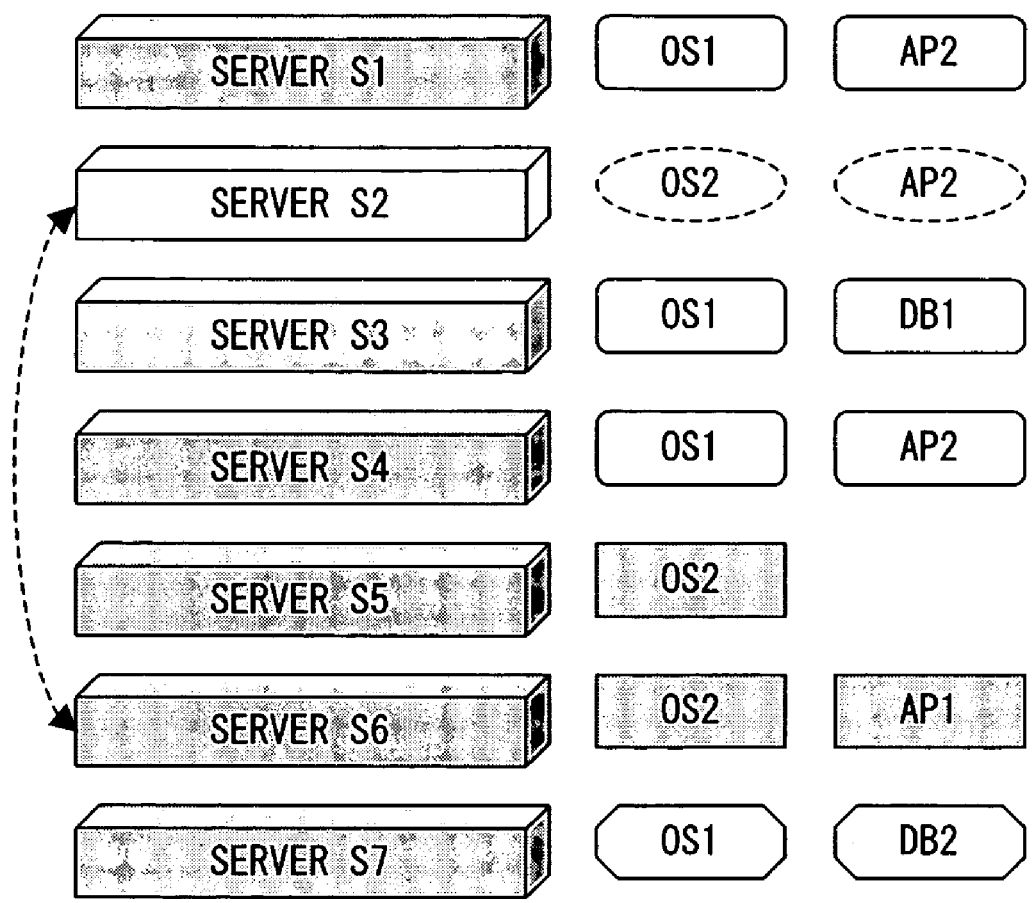
F I G. 1 7

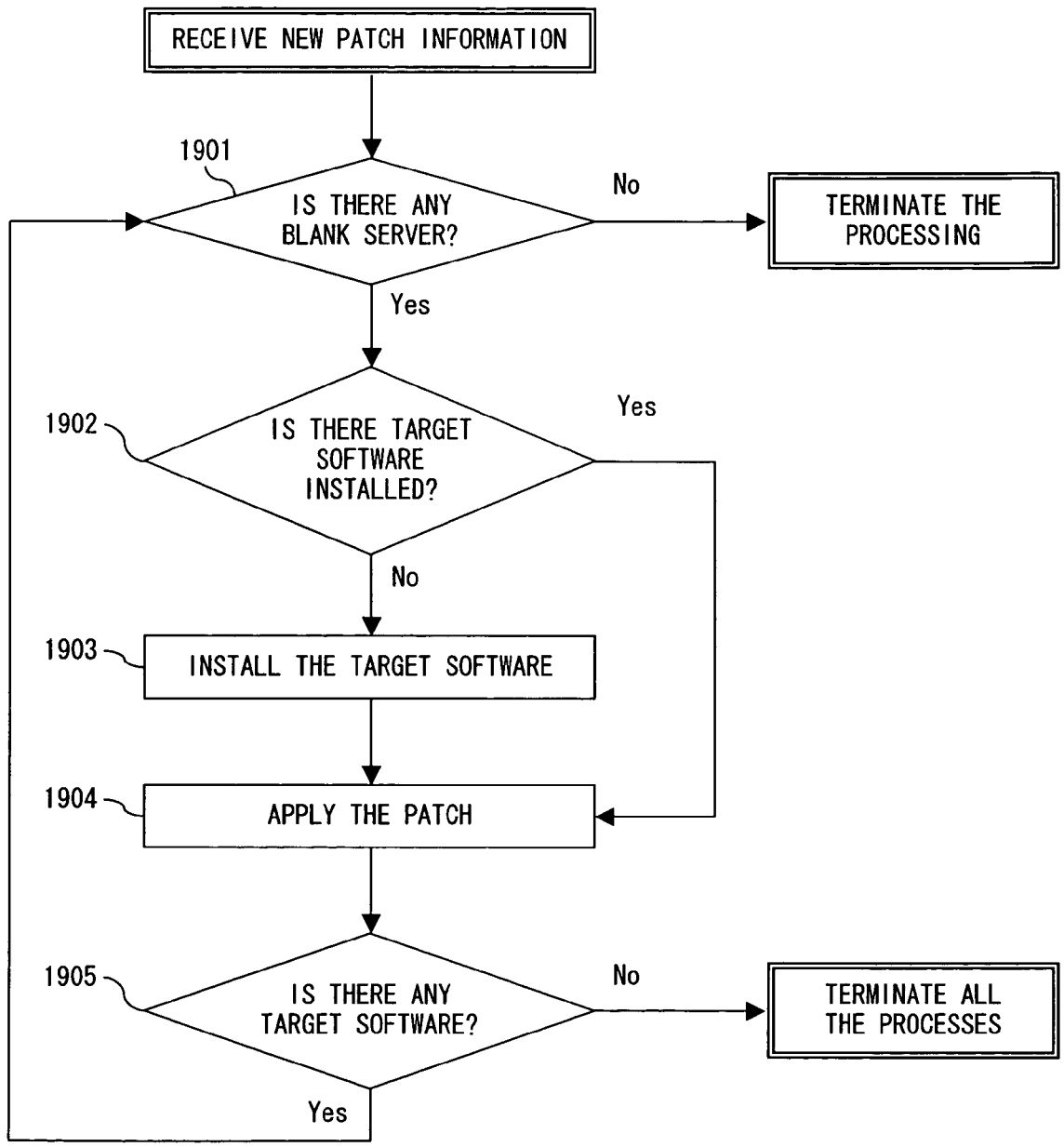
F I G. 1 9

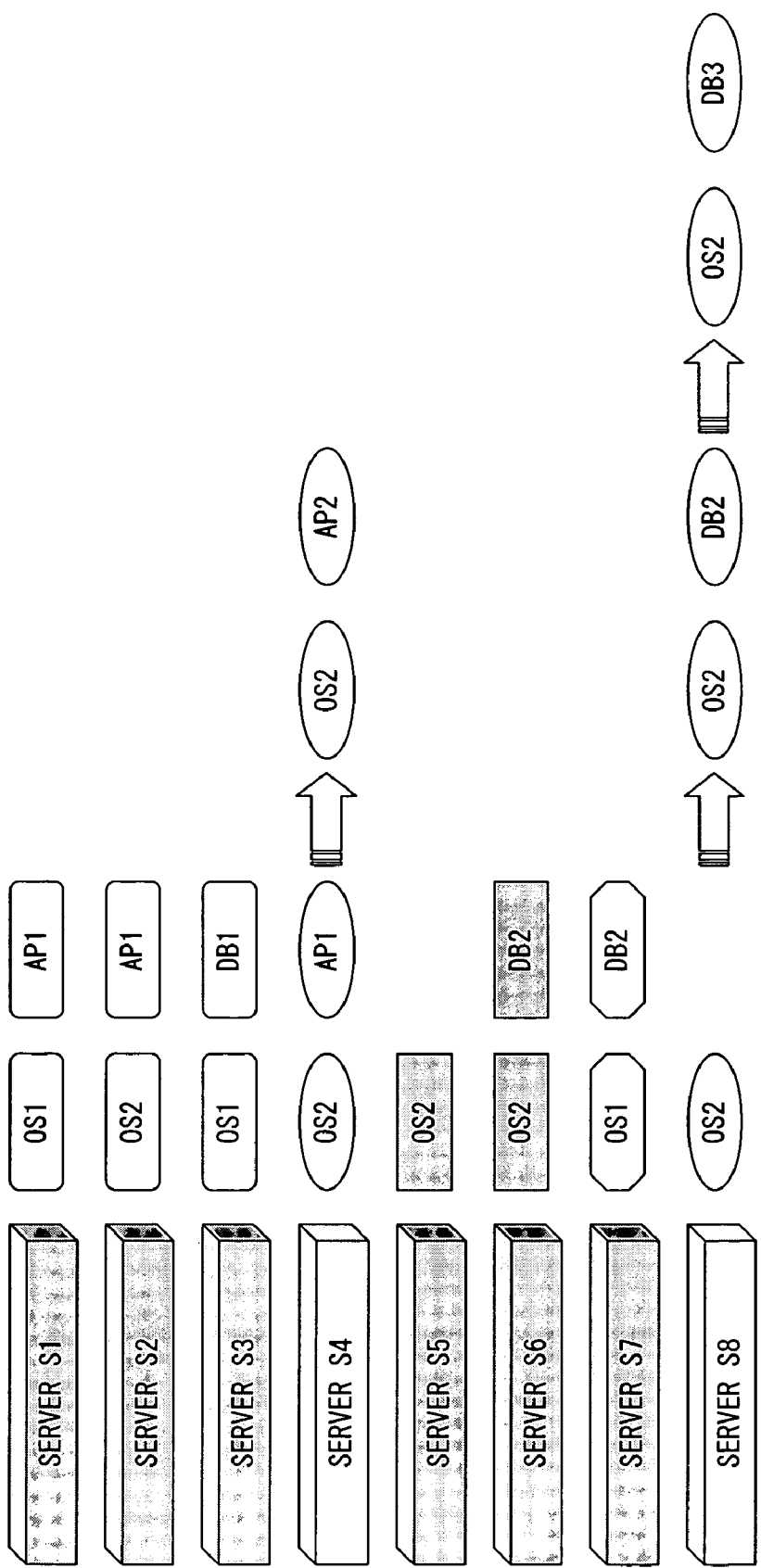
F I G. 20

APPARATUS AND METHOD FOR APPLYING REVISION INFORMATION TO SOFTWARE

BACKGROUND OF THE INVENTION

1. Field of the Invention

The present invention relates to an apparatus and method for applying revision information to software in a system that dynamically assigns software to a plurality of servers to perform customer services.

2. Description of the Related Art

A system that makes effective use of computer resources by dynamically assigning a plurality of computer resources to a plurality of customers in a data center that has a network environment and maintains and manages a computer system has been proposed in the recent years. Enumerated as such a system are Autonomic Computing of IBM (International Business Machine Corporation), Utility Data Center of HP (Hewlett-Packard Company) and N1 of Sun Microsystems, Inc.

Enumerated as computer resources are hardware such as a CPU (central processing unit), network apparatus as well as software such as an operating system (OS) and application programs (hereinafter referred to as "applications"). Included in the software are not only programs for OS and applications but also data used by the programs.

FIG. 1 shows which version of each customer's software is operating in each server in such a system. In this example, the servers S1 to S3 are assigned to customer A, the servers S5 and S6 are assigned to customer B, and the server S7 is assigned to Customer C.

In the server S1, for example, operating system OS1 and application AP1 are operating as the system of customer A, and in the server S6, operating system OS2 and database DB2 are operating as the system of customer B. In the server S7, operating system OS1 and database DB2 are operating as the system of customer C. In the server S4, nothing is operating and this server is unused. The system of any of the customers can be operated by the server S4 depending on certain circumstances.

The system in which a plurality of customers share a plurality of servers to dynamically change the operating state is a new system, and a new method is also required for the maintenance and operation of the resources. With regard to the software in particular, since revision information (patch) is provided by a vendor from time to time, it is necessary to apply such a patch to the system each time it is provided in order to maintain and manage the system.

In a conventional maintenance and operation method, an operator of a data center performs maintenance manually. For example, resource information on the system is managed in the form of a table, and when revision information for the resources is provided by a vendor, the operator analyzes the information and compares the system configuration designated by the vendor and the present system configuration, and then decides whether he should apply the revision information to the resources In fact, in most of conventional maintenance and operation methods, when revision information is applied to the resources, the operator stops the operation of a customer's system at the timing that has been determined between the customer and the data center in advance (for example, twice a week in the middle of the night, say, 1:00 to 3:00 AM), and carries out the revision work manually.

A system that supports the application of program revision to a single customer's system has been also proposed. (Refer to patent document 1, for example.) Patent document 1: Japanese laid-open patent publication No. 2000-10766

However, there are the following problems in the above-mentioned conventional maintenance and operation system. It is not possible to apply a patch to the resources that have already been assigned as a customer service and are actually operating, and there is a danger that the operation of the system must be stopped in order to apply the patch to the resources.

Moreover, if the number of resources becomes large, it is impossible to easily know which software has become which version. Even though an emergency patch is issued to a certain application, it takes time to investigate to which software the emergency patch must be applied. In other words, there is no systematic means for knowing what level of new versions of applications are operating and how safe they are for each of the large number of resources.

Consequently, such a system that can manage which software is operating at which server in a unified manner and can automate up to the updating of software has not yet been realized. However, when the number of servers becomes large, the operator cannot manage them within his ability any more, so that the functionality in which the system itself can automatically manage such a large number of servers will be inevitably required in the future.

Furthermore, it is not necessary to apply a patch to all the software. Any trouble may occur by applying the most up-to-date patch depending on the customized contents of a customer's system. Thus, a functionality that appropriately judges whether a patch should be applied to the software or not is also required.

SUMMARY OF THE INVENTION

The present invention has been developed to solve the above mentioned problems, and aim at providing an apparatus and method for appropriately applying revision information to software in a system that dynamically assigns a plurality of software to a plurality of servers to perform customer services.

The apparatus embodying the present invention in which revision information can be applied to software comprises a calculation device, a storage device, and an application device, and the apparatus applies revision information to software in a system that dynamically assigns a plurality of software to a plurality of servers to perform customer services.

The calculation device uses the information provided when revision information is issued and calculates an index to which there have been integrated the newness of the software that a customer is using and the security level of that software. The storage device stores the restricting conditions for the index that are designated by the customer. The application device checks whether the calculated index satisfies the restricting conditions, and if the calculated index does not satisfy the restricting conditions, the application device applies revision information to the software and updates the software.

BRIEF DESCRIPTION OF THE DRAWINGS

FIG. 1 shows a system that shares servers.

FIG. 7 shows a customer-used software list.

FIG. 8 is a dynamic assignment table.

FIG. 9 is an updating application table.

FIG. 12 shows the second state of the shared server pool.

FIG. 14 shows the fourth state of the shared server pool.

FIG. 17 shows the seventh state of the shared server pool.

FIG. 19 is a flowchart showing the processes of applying revision information to software in advance.

FIG. 20 shows the processes of applying revision information to software in advance.

DESCRIPTION OF THE PREFERRED EMBODIMENTS

Described below are the details of the best mode for carrying out the present invention with reference to the accompanying drawings.

Figure 2A:
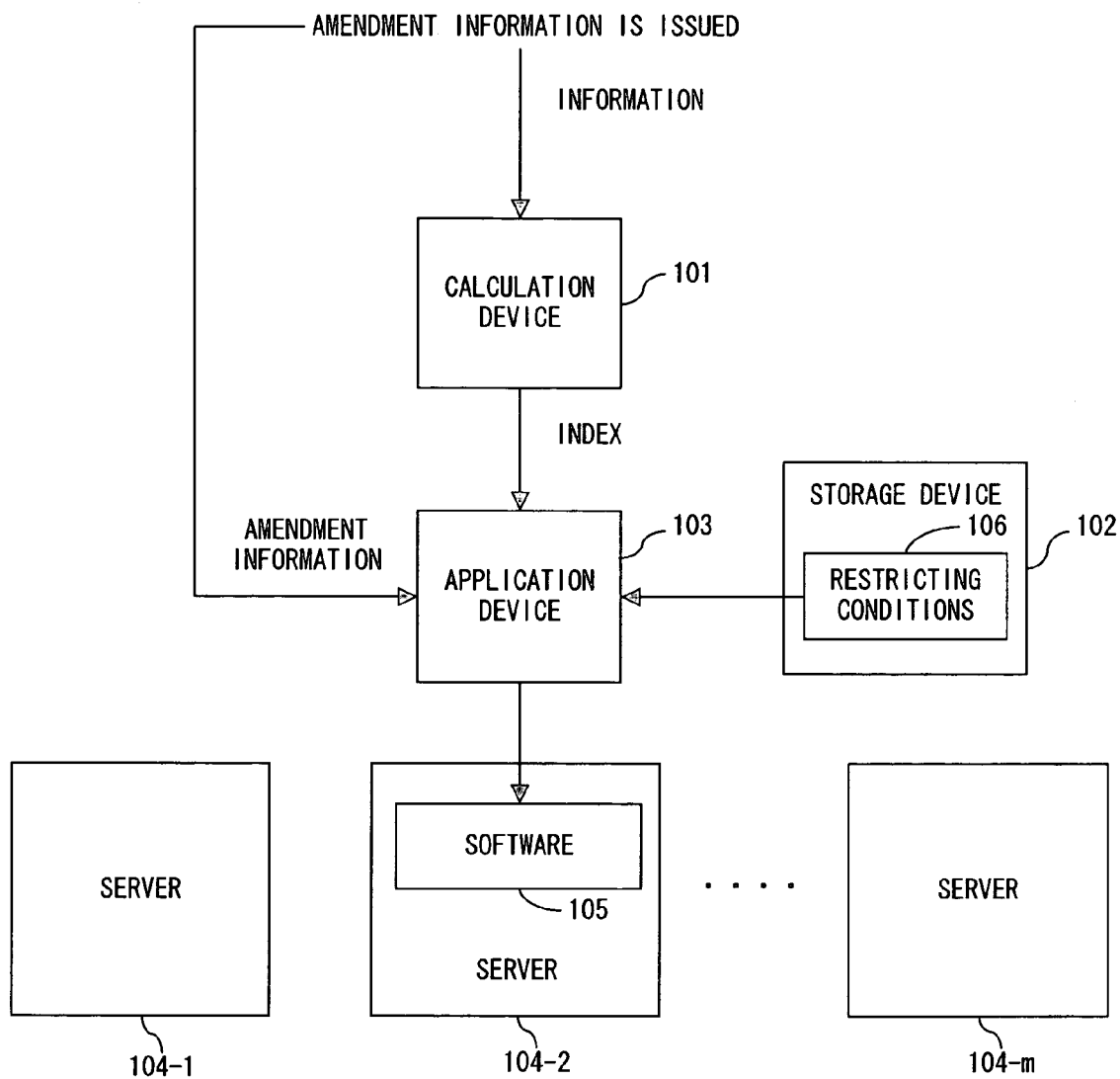
FIG. 2A shows the principles of an apparatus embodying the present invention in which revision information is applied to software.

FIG. 2A shows the principles of an apparatus embodying the present invention in which revision information is applied to software. The apparatus in which revision information is applied to software as shown in FIG. 2A comprises a calculation device 101, a storage device 102 and an application device 103, and the apparatus applies revision information to software in a system that dynamically assigns software to a plurality of servers, 104-1, 104-2, ..., 104-*m* and performs customer services.

The calculation device 101 calculates an index to which there have been integrated the newness of the software 105 that a customer uses and the security level of the software 105 using the information provided when revision information is issued. The storage device 102 stores the restricting conditions 105 for the index that are designated by the customer. The application device 103 checks whether the calculated index satisfies the restricting conditions 106 or not, and if the calculated index does not satisfy the restricting conditions 106, the application device 103 applies revision information to the software 105 and updates the software 105.

According to such an apparatus in which revision information is applied to software, each customer's software operating on the system can be managed uniformly using the index to which there have been integrated the newness of the software and the security level of the software as well as the restricting conditions that represent a customized level of each customer. This index is recalculated each time new revision information is issued, and when the index becomes unable to satisfy the restricting conditions that are set in advance, the issued revision information is applied to the software of the corresponding customer.

At that time, the application device 103 prepares the same software configuration as that for the processing-targeted server 104-2 in which the software 105 that the customer is using is operating, in the unused server that has not been assigned to any customer, applies revision information to the software 105 in the unused server, and assigns the unused server instead of the processing-targeted server 104-2 to the customer, thereby updating the software 105.

Moreover, the application device 103 can apply revision information to the software that has not been assigned to any customer in a unused server and updates the software, and when a customer who needs the software appears, the application device 103 can assign the unused server to that customer.

Figure 2B:
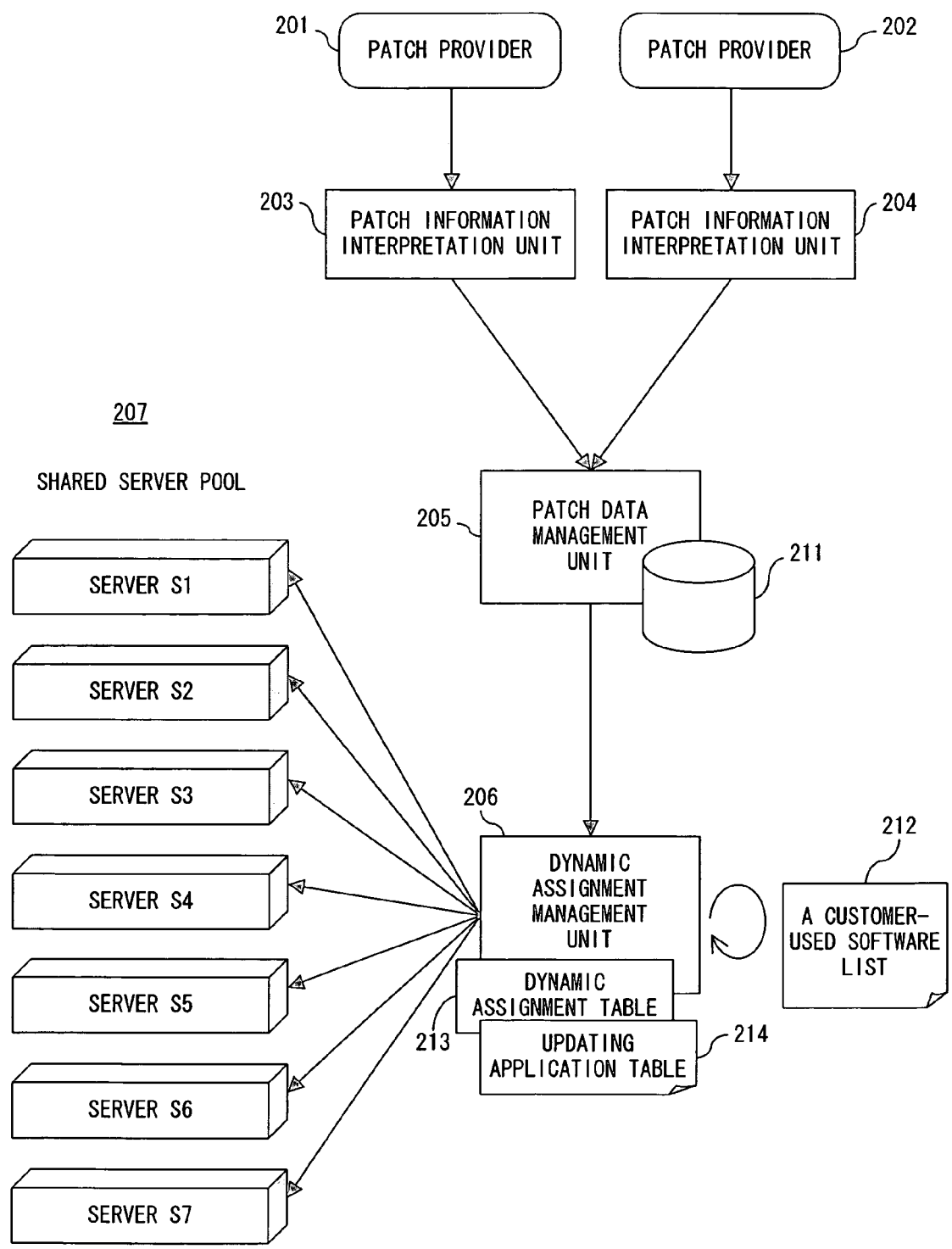
FIG. 2B shows the configuration of the apparatus embodying the present invention in which revision information is applied to software.

The calculation device 101, storage device 102 and application device 103 corresponds to, for example, the patch data management unit 205, list of software that a customer uses 212, and dynamic assignment management unit 206 respectively, which are shown in FIG. 2B and will be described later. The index that the calculation device 101 calculates corresponds to the clean point that will be described later.

According to the present invention, it is appropriately judged whether revision information should be applied or not depending on the operation state or the customized level of each customer's system. This function of the present invention makes the customer's system perform stable operation, thus causing the work by the customer's system operator to be reduced. In addition, the resources can be kept in the most up-to-date and safe state without stopping the operation of the customer's system by updating the software using the unused server.

Generally, customers expect that their systems should maintain a certain security level. Then, in the apparatus embodying the present invention in which revision information is applied to software, the security levels are numerically indicated, and an index of what is called a clean point of a software resource is also introduced so that the system can automatically judge whether it is necessary to apply a patch.

The clean point indicates the degree of the cleanness of software. The newer the version of software is and the higher the security level of the software is, the larger the numeral of the clean point becomes.

The apparatus embodying the present invention in which revision information is applied to software has the following functions of:

Calculating a clean point for each software;

Making a customer-used software list (i.e., a list of the software used by a customer) to manage the software that each customer requires and the restricting conditions for the software;

Making a dynamic assignment table to manage the state of assigning the resources to each customer;

Making an updating application table to manage the combination of the resources and the application state of patches;

Having a patch information interpretation unit to normalize the patch information provided by a software vendor so that the information can be uniformly managed by the system;

Having a patch data management unit to manage patch information and calculate clean points for the software in advance;

Having a dynamic assignment management unit to uniformly manage which software is operating for all the servers on the system;

Applying an updated patch to the software in advance using a unused server in which nothing has been assigned to any customer at any specific time, and assigning the software to a customer, thus providing clean software immediately;

Applying an urgent updated patch to the software using a unused server, and changing the unused server to an operating condition in due order, thus transferring the system in operation into a clean state; and Calculating the clean points for all the software that each customer has and visualizing the safety of each customer's system.

FIG. 2B shows the configuration of the apparatus in which revision information is applied to software. The apparatus shown in FIG. 2B in which revision information is applied to software comprises patch information interpretation units 203 and 204, a patch data management unit 205, a dynamic assignment management unit 206, and applies the patch provided from the patch providers 201 and 202 to the software of each customer's system operating in the shared server pool 207.

The patch providers 201 and 202 are the vendors who make each software, and patch information and the method of providing patch data differ according to each vendor. The patch information is the information with regard to the method of applying the patch provided from a provider of the patch, and the patch data is the data of the main patch part that is applied to software. The patch information interpretation units 203 and 204 absorb the difference in the method of providing patches that differ according to each vendor, and normalize the name, version and degree of importance of the software.

FIG. 2B shows two patch information interpretation units in accordance with two patch providers. If there are three patch providers or more, a plurality of patch information interpretation units are prepared in accordance with the number of patch providers. It is also possible that one patch information interpretation unit interprets the patch information provided from a plurality of patch providers.

The patch data management unit 205 manages the patch information and patch data stored in the database 211 with regard to all the software used in the shared server pool 207, and calculates the clean points of the software based on the time series and degree of importance of the patches. When a new patch is issued, the patch data management unit 205 notifies that patch information to the dynamic assignment management unit 206.

The dynamic assignment management unit 206 retains a customer-used software list 212, a dynamic assignment table 213, and an updating application table 214, and manages the contents of these tables dynamically. Also, the dynamic assignment management unit 206 judges whether a new patch can be applied referring to the customer-used software list 212, and if it judges that the new patch can be applied, it applies the new patch to the software in the shared server pool 207. The details as to how the new patch is applied will be described later.

The shared server pool 207 comprises a plurality of servers S1 to S7, and each customer's system operates in one or more of the seven servers. The operating condition differs depending on circumstances. A resource that is assigned to customer A at a certain time can be assigned to customer B at another time.

Described below are the details of the processing of the apparatus shown in FIG. 2B in which revision information is applied to software, referring to FIG. 3 to FIG. 20.

Figure 3:
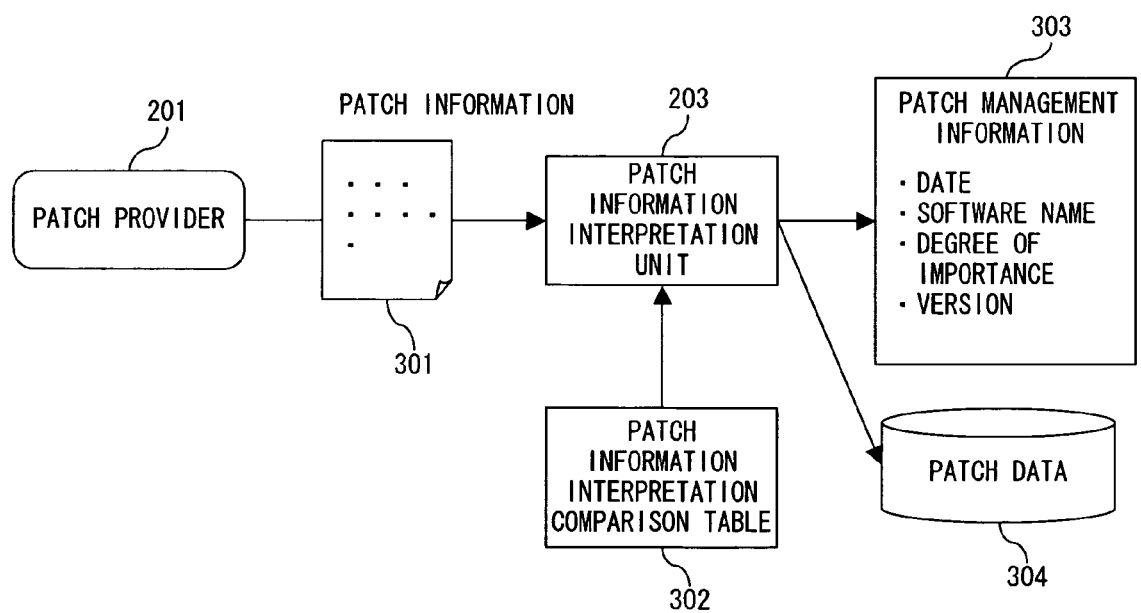
FIG. 3 shows the processing of the patch information interpretation unit.

FIG. 3 shows the patch information interpretation processing that is performed by the patch information interpretation unit 203 shown in FIG. 2B. Patch information 301 issued from a patch provider 201 is transmitted to the patch information interpretation unit 203 by means of e-mail, etc. The patch information interpretation unit 203 interprets the patch information 301 with reference to a patch information interpretation comparison table 302, extracts the date, software name, degree of importance, and patch management information including versions from the patch information 301, and obtains patch data 304 from a link destination side included in the patch information 301. Then, the patch information interpretation unit 203 registers the obtained patch management information 303 and patch data 304 in the database 211.

Figure 4:
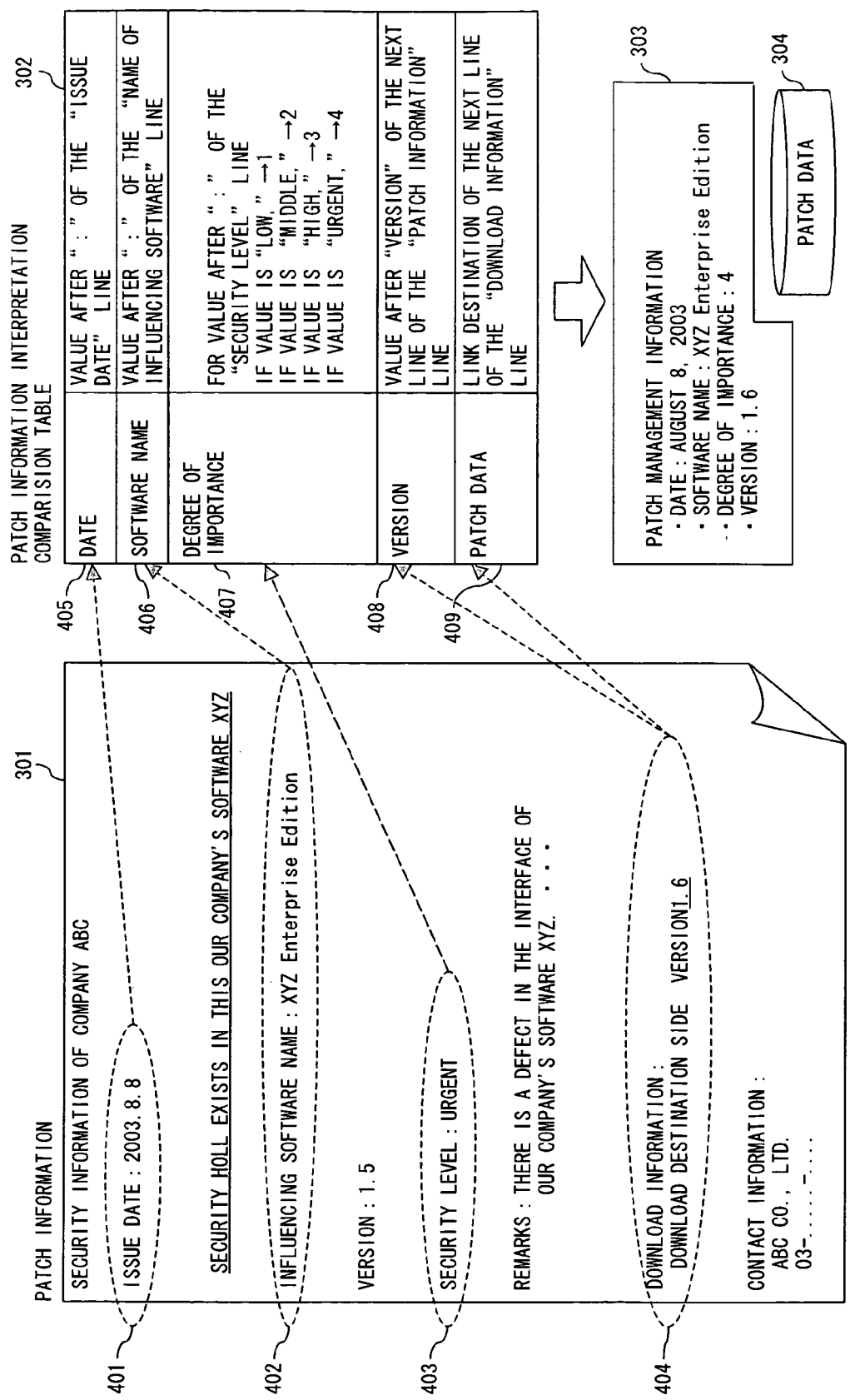
FIG. 4 shows patch information.

FIG. 4 shows examples of the patch information 301, patch information interpretation comparison table 302, patch management information 303, and patch data 304. Included in the patch information 301 are issue date 401, name of influencing software 402, security level 403, and download information 404. Included in the patch information interpretation comparison table 302 are entries of date 405, software name 406, degree of importance 407, version 408, and patch data 409, and the positions for describing necessary management information are recorded for each entry.

The patch information interpretation unit 203 extracts management information from the corresponding position in the patch information 301 based on the information existing in the describing position recorded for each entry. The extracted version is the version of the patch and at the same time is the version of the software.

For the entry for the degree of importance 407 in the patch information interpretation comparison table 302, the degree of importance is designated by the number starting from 1 in the ascending order according to the kind of the security level 403 described in the patch information 301. Since "urgent" is described for the security level 403 in this example, the corresponding degree of importance "4" is outputted as the patch management information 303.

The patch information interpretation unit 203 extracts information of the link destination side from the corresponding position in the patch information 301 based on location information recorded in the entry of patch data 409, and downloads the patch data 304 from the link destination side.

By preparing such a patch information interpretation comparison table 302 for each provider who provides patches of the software that a customer uses, the apparatus in which revision information is applied to software can automatically obtain necessary information.

Figure 5:
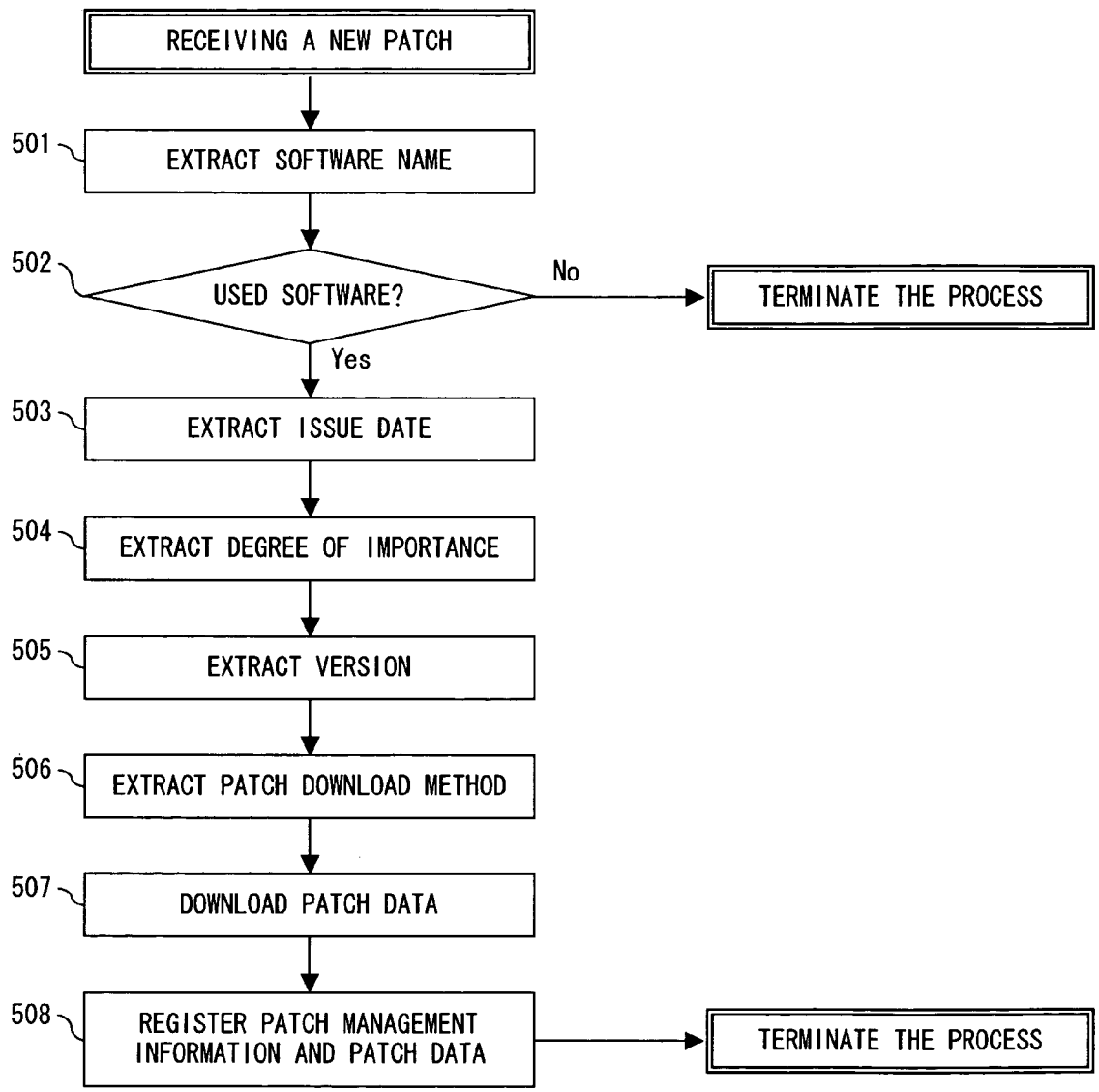
FIG. 5 is a flowchart showing the patch information interpretation processing.

FIG. 5 is a flowchart showing the above described patch information interpretation processing. When the patch information interpretation unit 203 receives new patch information 301 from the patch provider 201, the patch information interpretation unit 203 refers to the patch information interpretation comparison table 302, extracts the name of the software that corresponds to the patch to be applied (Step 501), and checks whether the software is the one that is used by the system (Step 502). If the name of the software does not correspond to the software that is used by the system, it is not necessary to apply the patch to the software, so the processing is terminated.

If the name of the software corresponds to the software that is used by the system, the patch information interpretation unit 203 extracts patch issue date (Step 503), extracts the degree of importance of the patch (Step 504) and extracts the version of the patch (Step 505).

Next, the patch information interpretation unit 203 extracts the method of downloading the patch (Step 506) and downloads patch data 304 according to that method (Step 507). Then, the patch information interpretation unit 203 registers the patch management information 303 that comprises the date extracted, software name, degree of importance, and version as well as the patch data downloaded 304 into the database 211 (Step 508), and terminates the processing. The patch information interpretation unit 204 shown in FIG. 2B performs the basically same processing as the patch information interpretation unit 203 does.

Figure 6:
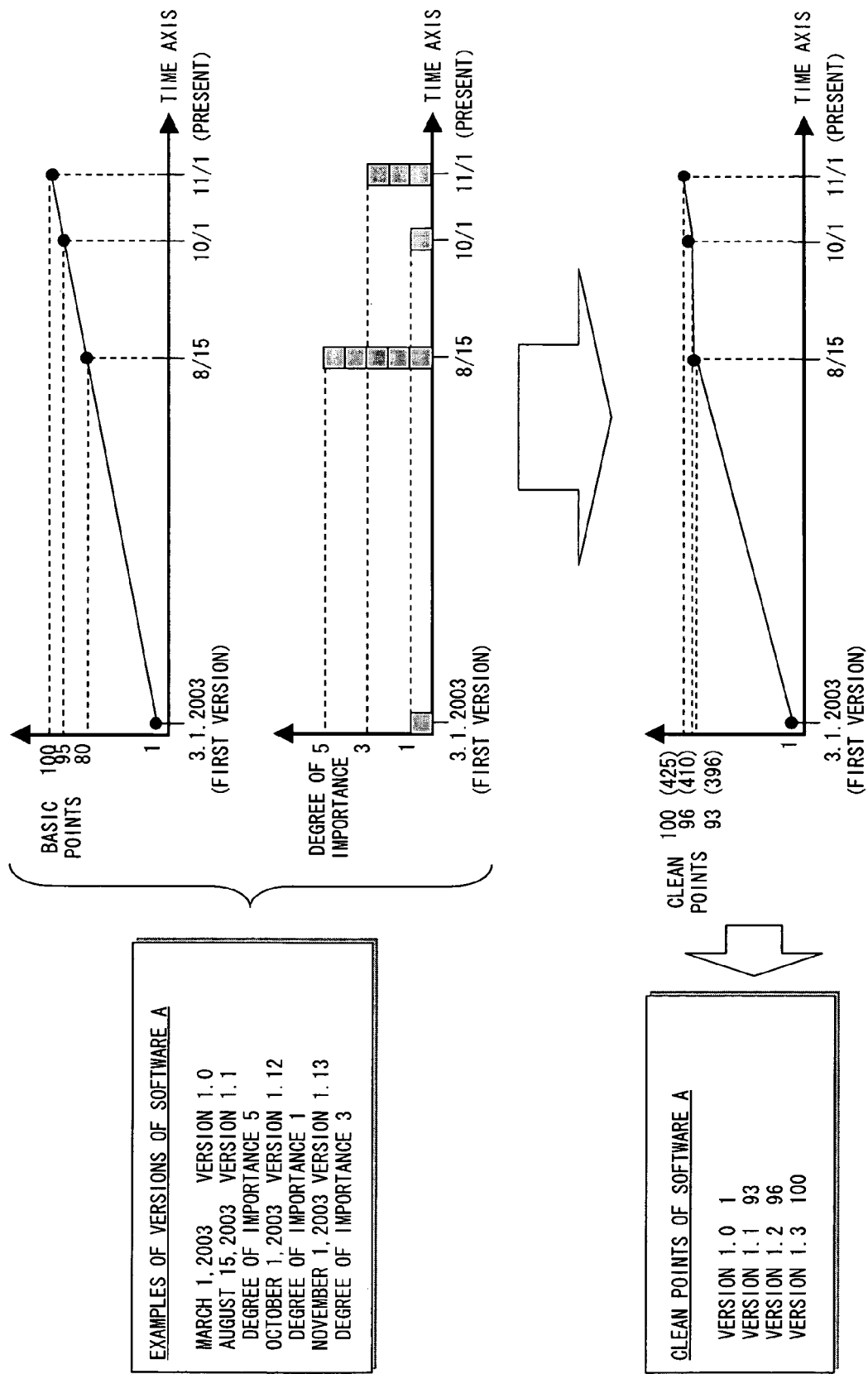
FIG. 6 shows the method of calculating clean points.

FIG. 6 shows an example of the method of calculating clean points that are used by the patch data management unit 205 shown in FIG. 2B. The patch data management unit 205 calculates clean points of each version based on the patch management information on each version of software A registered in the database 211. At that time, the patch data management unit 205 calculates the clean points of each version prior to normalization from the basic points and the degree of importance of each version, and normalizes the obtained values based on the value of the most up-to-date version.

In this calculation method, first, time axis is made based on the issue date of version 1.0 that is the first version of software A and the issue date of version 1.3 that is the most up-to-date version of software A. Then, basic points corresponding to the issue date of each version are calculated using "1" as the first version and "100" as the most up-to-date version, and a basic point graph is made accordingly.

In the example shown in FIG. 6, the basic points of each version of software A are calculated as follows.

| | |
|---|---|
| Version 1.0 | Basic points "1" |
| Version 1.1 | Basic points "80" |
| Version 1.2 | Basic points "95" |
| Version 1.3 | Basic points "100" |

Next, a degree of importance graph is made based on the degree of importance of each version using "1" as the degree of importance of the first version. Finally, a graph that changes the inclination of the basic point graph according to the degree of importance of each version is made, and the points of each version are normalized so that the point of the most up-to-date version becomes "100." The points of each version that are calculated in this manner are recorded as clean points.

The method of calculating the clean points is indicated by the following equations.

$$a_n = a_{n-1} + (t_n - t_{n-1}) \times s_n \ (n=1, \ldots, N) \quad (1)$$

$$C_1 = 1 \quad (2)$$

$$C_i = (a_i/a_N) \times 100 \ (I=2, \ldots, N) \quad (3)$$

However, in the equation (1), $t_n$ represents the basic point of the nth version, $s_n$ represents the degree of importance of the nth version, $a_N$ represents the clean point before the nth version is normalized, and $t_0=0$, and $a_0=0$. The 1st version corresponds to the first version of the software, while the nth version corresponds to the most up-to-date version of the software. Also, $C_i$ (i=1, ..., N) in the equations (2) and (3) represents the normalized clean point of the ith version.

Actually, the patch data management unit 205 does not display such a graph as shown in FIG. 6 on the screen, but directly calculates the clean points using the equations (1) to (3). According to this calculation method, it is possible to uniformly indicate in terms of numerals the patches of all the versions including the patches that are important though being old and the patches that are not so important though being new.

The equations (1) to (3) show only one example of the method of calculating clean points, so the method of calculating clean points is not limited to this example. FIG. 7 shows an example of a customer-used software list 212, which is retained by the dynamic assignment management unit 206 shown in FIG. 2B. The customer-used software list 212 shown in FIG. 7 is used to manage a list of the software that each customer uses, and the list comprises columns of customer name, software name, version restricting condition, and CL (clean point) threshold value.

When software must be operated in specified version, the conditions for specifying that version are recorded in the column of version restricting condition. Recorded in the column of CL restricting condition are the restricting conditions specified by each customer that the clean points of the software must satisfy. Included in the restricting conditions is, for example, a CL threshold value.

The entries 701, 702, 703 shown in FIG. 7 have the following meanings.

701: Customer "USER1" uses software "Software1" with clean point 85 or more out of various kinds of versions.

702: Customer "USER1" uses software "Software2" with clean point 90 or more out of various kinds of versions. Since "Software2" is frequently upgraded, the clean point threshold value for "Software2" is set to a value higher than that for "Software1."

703: Customer "USER1" uses "Software3" in version 1.3. In this case, however, the clean point of version 1.3 is presumed to be "70."

The dynamic assignment management unit 206 recognizes the software and clean level that a customer requires using the customer-used software list. FIG. 8 is an example of a dynamic assignment table 213 retained by the dynamic assignment management unit 206 shown in FIG. 2B. The dynamic assignment table in FIG. 8 is used to manage which software is assigned, in which server, and to which customer, in the present system, and the table 213 comprises columns of server name, customer name, installed software name, and version. Recorded in the column of installed software name is the name of the software that is installed in the server, and recorded in the column of version is the version of that software.

The entries 801 to 804 in FIG. 8 have the following meanings.

801: Software "Software1" in version "1.3" is operating in server "S1" for customer "USER1."

802: Software "Software2" in version "5.2" is operating in server "S1" for customer "USER1."

803: Software "Software1" in version "1.3" is operating in server "S2," but this software has not been assigned to any customer yet.

804: Software "Software3" in version "3.3" is operating in server "S3" for customer "USER2."

The dynamic assignment management unit 206 recognizes the state of all the customers' systems that are operating in the server at present using this dynamic assignment table. FIG. 9 is an example of an updating application table that the dynamic assignment management unit 206 shown in FIG. 2B retains. The updating application table in FIG. 9 is used to manage the present state of the system, namely, which version of software is operating and in which server, and the table 214 comprises columns of software name, server name, version and CL.

The entries 901 to 904 in FIG. 9 have the following meanings.

901: Software "Software1" in version "1.3" (clean point "70") is operating in server "S1."

902: Software "Software1" in version "1.4" (clean point "80") is operating in server "S2."

903: Software "Software1" in version "1.5" (clean point "100") is operating in server "S3."

904: Software "Software2" in version "5.3" (clean point "89") is operating in server "S2."

The dynamic assignment management unit 206 recognizes the state of the software that is operating in all the servers using this updating application table. Reference to this updating application table in combination with the dynamic assignment table shown in FIG. 8 makes it possible to automatically update the software using a unused server that has not been assigned to any customer.

Figure 10:
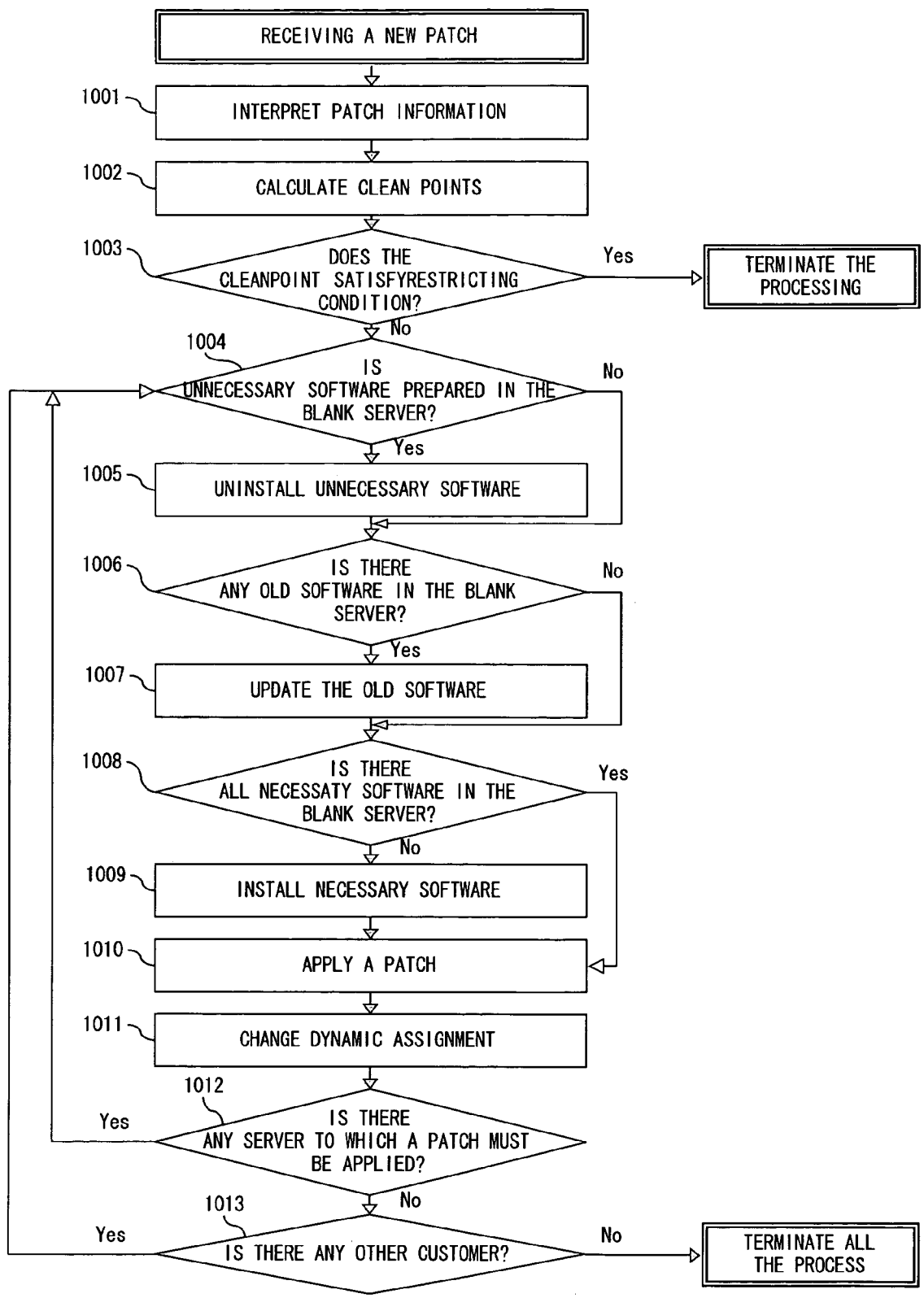
FIG. 10 is a flowchart showing the processes of applying revision information to software.

FIG. 10 is a flowchart showing the processes of applying revision information to software, which are executed by the apparatus in which revision information is applied to software as shown in FIG. 2B. When the patch information interpretation unit 203 receives new patch information from a patch provider, the unit 203 interprets the patch information as shown in FIG. 5, and registers the patch management information and patch data into the database 211 (Step 1001).

Next, the patch data management unit 205 refers to the patch management information stored in the database 211, calculates the clean point of each version of the software that is the target for applying the patch, and notifies the obtained value of the clean point to the dynamic assignment management unit 206 (Step 1002).

The dynamic assignment management unit 206 retrieves the customer-used software list 212 using the software name of the patch management information as a key, and obtains the CL restricting conditions that each customer sets for that software. Also, the dynamic assignment management unit 206 retrieves the dynamic assignment table 213 using that software name as a key, and obtains the version of that software that is assigned to each customer.

The dynamic assignment management unit 206 checks whether the value of the clean point corresponding to the version of each customer among the notified clean point of each version satisfies the CL restricting conditions of that customer (Step 1003). If the value of the clean point of each version satisfies the CL restricting conditions of the corresponding customer, the dynamic assignment management unit 206 judges that it is not necessary to apply the patch to the software of that customer, then terminating the processing.

If the value of the clean point corresponding to any of the versions does not satisfy the CL restricting conditions of the corresponding customer, the dynamic assignment management unit 206 judges that it is necessary to apply the patch to the software of that customer. Then, the dynamic assignment management unit 206 creates a state in which the software configuration is the same as that for the server assigned to that customer, and the patch is applied to the target software using the unused server in the shared server pool 207 (Steps 1004 to 1010). At that time, if no necessary software is prepared in the unused server, each software is installed or uninstalled, and is updated depending on circumstances.

The dynamic assignment management unit 206, first, refers to the dynamic assignment table 213 and detects the server in which the target software is installed and a unused server, and sets the former as the target server. To realize the same configuration as that of the target server, the dynamic assignment management unit 206 checks whether there is any unnecessary software in the unused server (Step 1004), and if there is any such software in the unused server, the unit 206 uninstalls that software (Step 1005).

Next, the dynamic assignment management unit 206 refers to the dynamic assignment table 213, and checks whether there is any software other than the target software that is older in its version than the target software in the unused server (Step 1006). If there is any such software in the unused server, the unit 206 updates that software (Step 1007).

Next, the dynamic assignment management unit 206 refers to the dynamic assignment table 213, and checks whether there is all the software necessary to realize the same configuration as that of the target server in the unused server (Step 1008), and if there is any lacking software, the unit 206 installs that software in the unused server (Step 1009).

Then, the dynamic assignment management unit 206 applies a patch to the target software in the unused server, updates that software (Step 1010), rewrites the dynamic assignment table 213, and changes the assignment of a server to a customer from the target server to the unused server (Step 1011).

Next, the dynamic assignment management unit 206 refers to the dynamic assignment table 213, and checks whether there is any server in which the patch must be applied among the remaining servers assigned to the same customer (Step 1012), and if there is any such server, the unit 206 repeats the processes of Step 1004 and the following steps using that server as the target server.

When the dynamic assignment management unit 206 terminates the processing for all the servers of that customer, the unit 206 refers to the dynamic assignment table 213, and checks whether it is necessary to apply the patch to the servers assigned to the remaining customers (Step 1013). If there is any such server, the dynamic assignment management unit 206 repeats the processes of Step 1004 and the following steps one after another, and when the unit 206 terminates the processing for the systems of all the customers, the unit 206 rewrites the updating application table 214 in accordance with the present system configuration, and terminates the processes of applying revision information to software.

Figure 11:
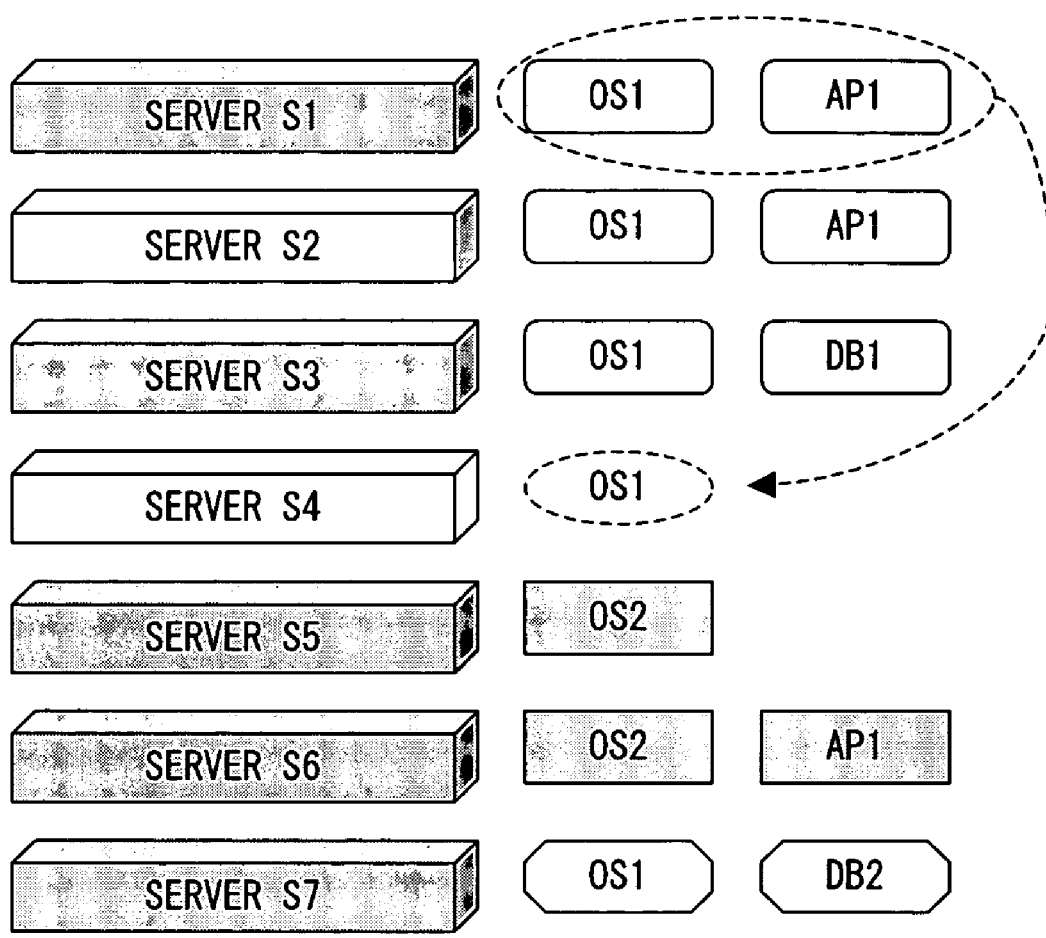
FIG. 11 shows the first state of the shared server pool.

For example, a system is supposed to be operating at a certain moment in the state as shown in FIG. 11. In this state, servers S1, S2 and S3 are assigned to customer A, servers S5 and S6 are assigned to customer B, and server S7 is assigned to customer C. Server S4 is a unused server.

Operating system OS1 and application AP1 are operating in the servers S1 and S2, operating system OS1 and database DB1 are operating in the server S3, and only operating system OS1 is operating in the server S4. Also, only operating system OS2 is operating in the server S5, operating system OS1 and application AP1 are operating in the server S6, and operating system OS1 and database DB2 are operating in the server S7. The operating system OS2 corresponds to a new version of the operating system OS1.

When an emergency updating patch such as a patch to cope with security holl is issued to AP1, the processes of applying revision information to software are executed in the following procedures. The dynamic assignment management unit 206, first, applies a patch to AP1 of the server S1, and decides to update it to AP2. Since the server S4 is unused, the unit 206 creates a state in which the software configuration is the same as that of the server S1 and AP1 is updated to AP2 using the server S4. OS1 has already been installed in the server S4, but AP1 has not been installed yet, so AP1 is installed in the server S4 as shown in FIG. 12.

Figure 13:
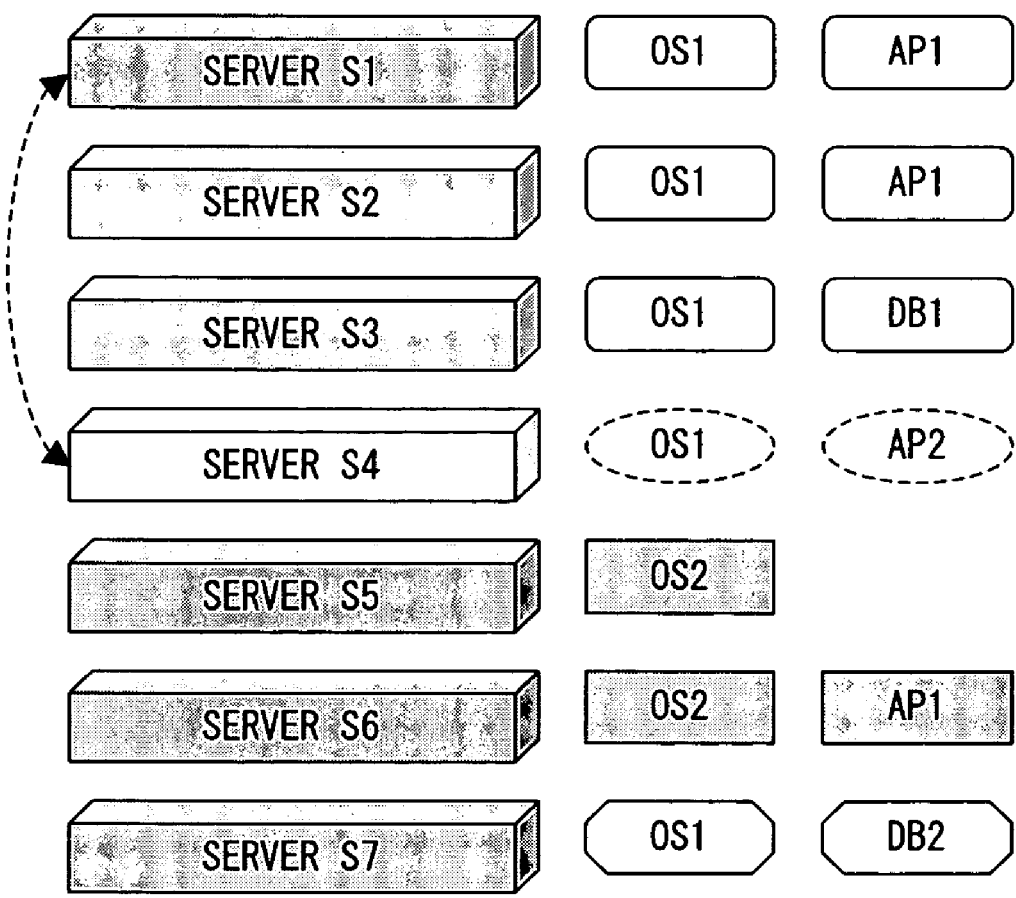
FIG. 13 shows the third state of the shared server pool.

Next, the patch is applied to AP1 of the server S4 to update AP1 to AP2, and the dynamic assignment of the server S1 is changed over to the server S4, as shown in FIG. 13. Thus, the server S4 is assigned to customer A, and becomes a clean operating condition, as shown in FIG. 14, while the server S1 becomes a unused server.

Figure 15:
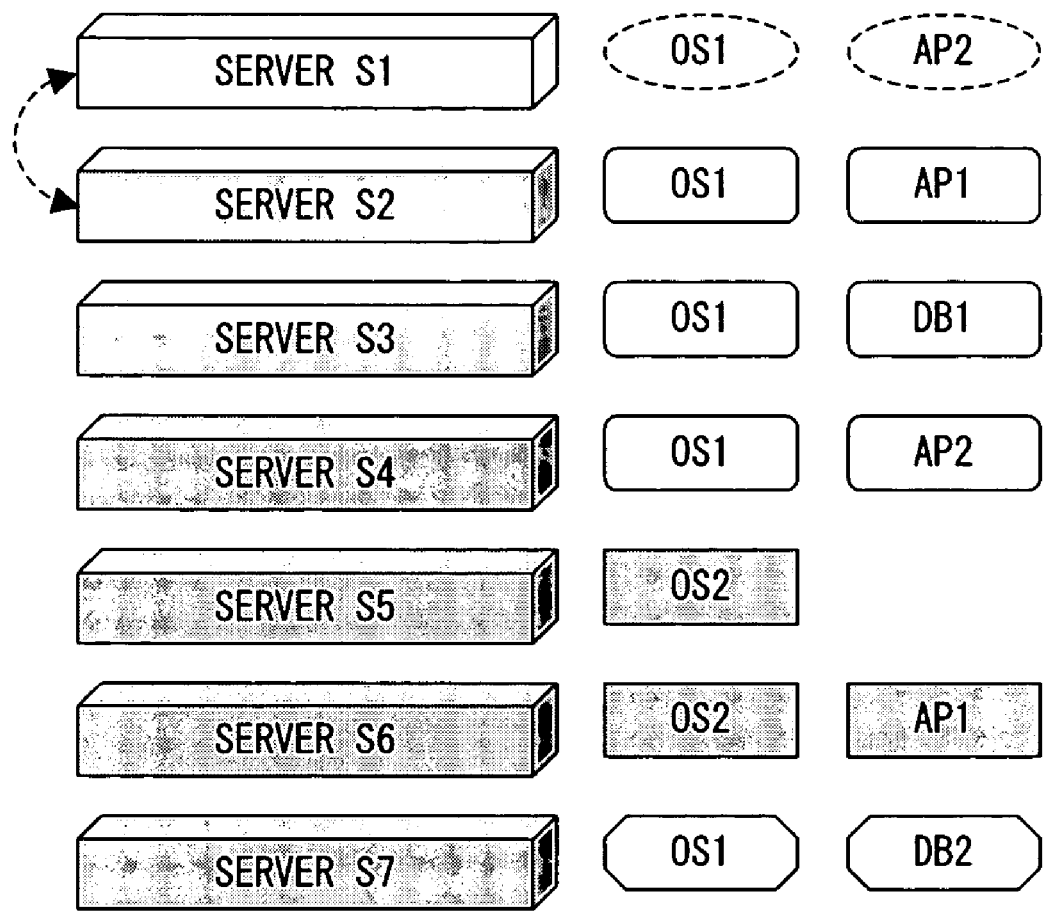
FIG. 15 shows the fifth state of the shared server pool.
Figure 16:
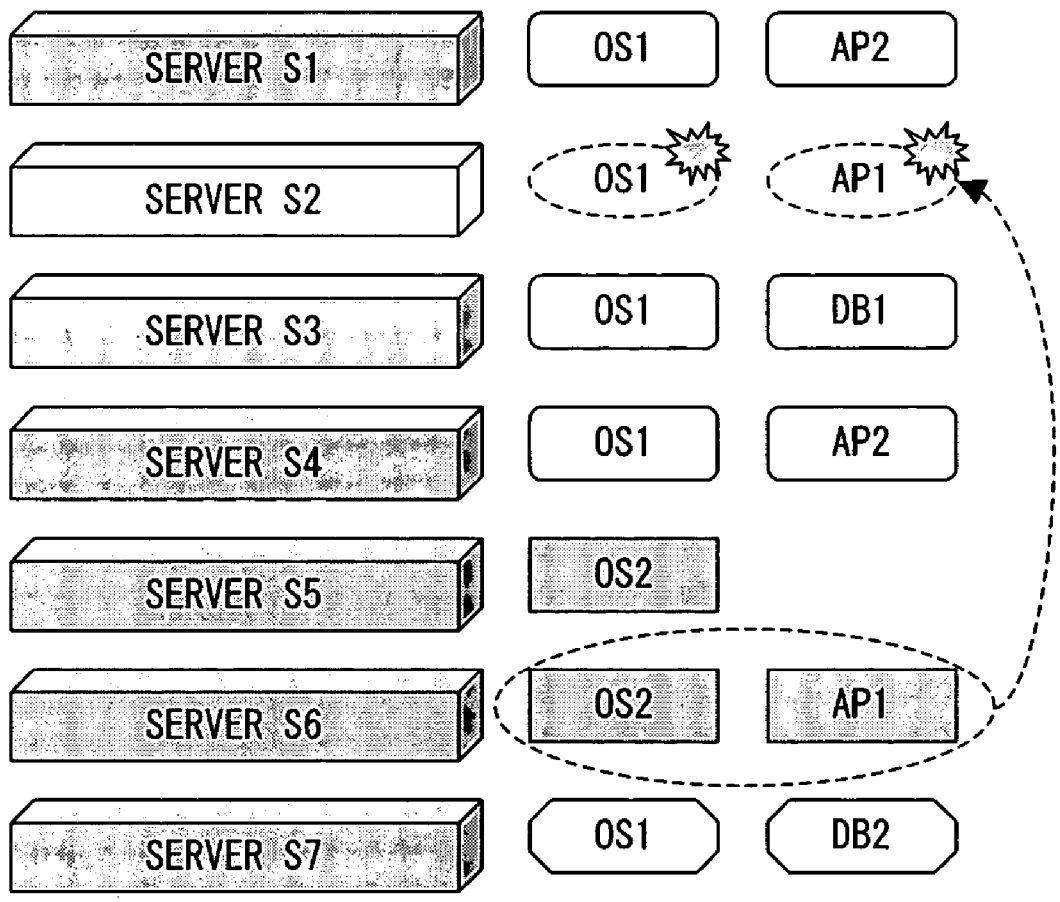
FIG. 16 shows the sixth state of the shared server pool.

Next, the dynamic assignment management unit 206 decides to update AP1 of the server S6 to AP2. Since the server S2 is blank, the unit 206 creates a state in which the software configuration is the same as that of the server S2 and AP1 is updated to AP2 using the unused server S2. Since OS1 and AP1 have already been installed in the server S1, AP1 of the server S1 is updated to AP2 as shown in FIG. 15, and the dynamic assignment of the server S2 is changed over to the server S1. Thus, the server S1 is assigned to customer A again and becomes a clean operating condition as shown in FIG. 16, while the server S2 becomes a unused server.

Figure 18:
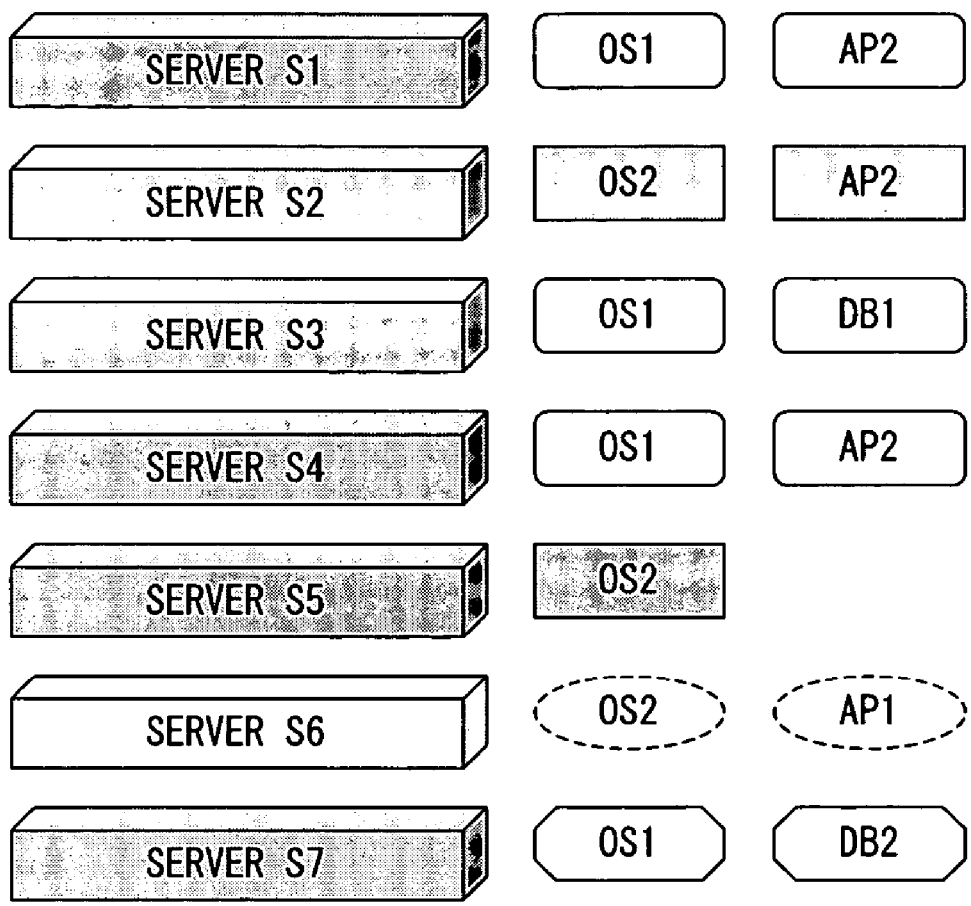
FIG. 18 shows the eighth state of the shared server pool.

Next, the dynamic assignment management unit 206 decides to update AP1 of the server S2 to AP2. Since the server S2 is unused, the unit 206 creates a state in which the software configuration is the same as that of the server S6 and AP1 is updated to AP2 using the unused server S2. OS1 and AP1 have already been installed in the server S2, but what is necessary is that OS2 and AP2 are installed in the server S2. Then, OS1 is updated to OS2, and then AP1 is updated to AP2, as shown in FIG. 17, and the dynamic assignment of the server S6 is changed over to the server S2. Thus, the server S2 is assigned to customer B, and becomes a clean operating condition as shown in FIG. 18, while the server S6 becomes a unused server. In this way, all the AP1s in operation have been updated to AP2.

According to the these processes of applying revision information to software, it is possible to minimize the useless suspension of the operation of a system that may be necessary to apply the patch by applying the patch in customers' systems one after another in the order of a higher degree of importance using a unused server. Since one unused server or more must be always kept, idleness seems to occur at a glance. In fact, this unused server can be used for various processing in the apparatus in which revision information is applied to software. For example, if the calculation of clean points and dynamic assignment management are carried out using the unused server, the unused server can be effectively used.

In the processes of applying a patch to software as shown in FIG. 10, a patch is applied to the software that has already been assigned to a customer. However, if a unused server is used, a patch can be applied in advance to the software that has not been assigned to any customer yet. Thus, updated software can be prepared in the unused server in advance while a system is actually operating, so the system can be kept in a clean condition. Consequently, when dynamic assignment occurs for a next customer, a clean resource can be assigned promptly.

FIG. 19 is a flowchart showing the processes of applying a patch to software in advance. These processes are executed, for example, after the processes of applying a patch to software as shown in FIG. 10 are executed. The dynamic assignment management unit 206, first, refers to the dynamic assignment table 213, and checks whether there is any unused server (Step 1901), and if there is no unused server, the unit 206 terminates the processing.

If there is any unused server, the unit 206 refers to the dynamic assignment table 213, and checks whether there is any software that is the target to which a patch can be applied (Step 1902), and if there is no target software, the unit 206 installs the target software in the unused server (Step 1903). Then, the unit 206 applies the patch to the target software in the unused server and updates that software (Step 1904).

Next, the unit 206 checks whether there is any other target software (Step 1905), and if there is any such software, the unit 206 repeats the processes of Step 1901 and the following steps for such software. When the unit 206 terminates the processing for all the target software, the unit 206 rewrites the dynamic assignment table 213 and the updating application table 214 in accordance with the present system configuration, and terminates the processes of applying the patch to the software in advance.

For example, in the shared server pool comprising servers S1 to S8, a system is supposed to be operating in the state shown in FIG. 20. In this state, servers S1, S2 and S3 are assigned to customer A, servers S5 and S6 to customer B, and server S7 to customer C. Servers S4 and S8 are unused servers.

In servers S1 and S2, operating system OS1 and application AP1 are operating. In server S3, operating system OS1 and database DB1 are operating. In server S4, operating system OS2 and application AP1 are operating. In server S5, only operating system OS2 is operating. In server S6, operating system OS2 and database DB2 are operating. Also, in server s7, operating system OS1 and database DB2 are operating. In server s8, only operating system OS2 is operating. Database DB2 corresponds to a new version of database DB1.

When an updating patch is issued to AP1 and DB2, the processes of applying the updating patch to software in advance are executed in the following procedures. The dynamic assignment management unit 206, first, detects the unused server S4. Since OA2 and AP1 are already operating in server S4, the patch is applied to AP1 to update it to AP2. Next, the unit 206 detects the unused server S8. Only OS2 is operating in server S8. Since the patch is already applied to AP1 in server S4, server S8 is used to apply the patch to DB2. Then, DB2 is installed in server S8, and next the patch is applied to DB2 to update it to DB3.

Thus, an operating condition of AP2 and DB3 that are the most up-to-date versions of AP1 and DB2 is realized in the shared server pool. If dynamic assignment occurs to a customer who requires OS2 and AP2, server S4 can be assigned to that customer immediately. If dynamic assignment occurs to a customer who requires OS2 and DB3, server S8 can be assigned to that customer immediately.

Figure 21:
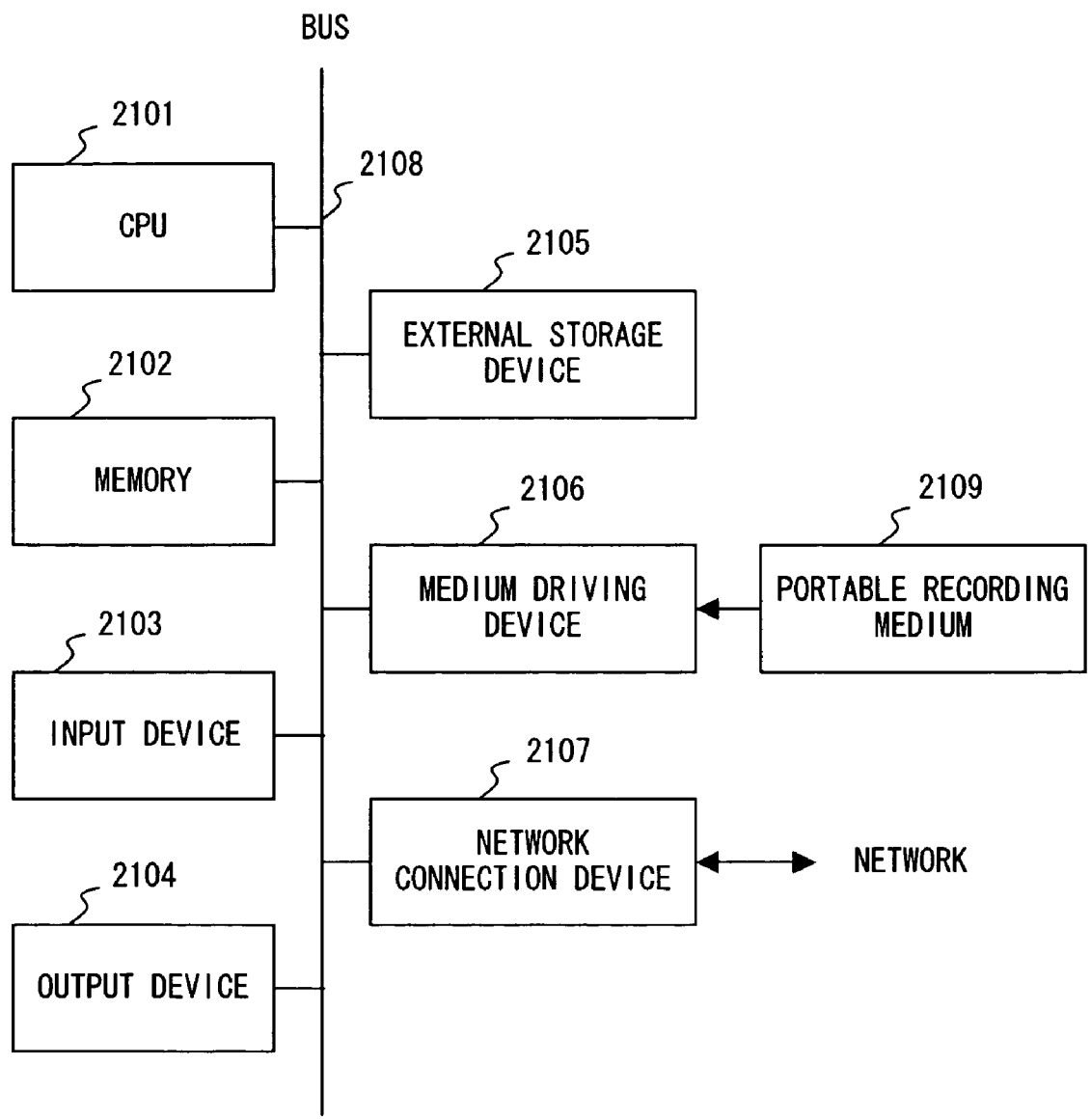
FIG. 21 shows the configuration of an information processing apparatus.

The apparatus in which revision information is applied to software and each server shown in FIG. 2B can be constituted using an information processing apparatus (computer) shown in FIG. 21. The information processing apparatus in FIG. 21 comprises a CPU 2101, a memory 2102, an input device 2103, an output device 2104, an external storage device 2105, a medium driving device 2106, and a network connection device 2107, and all these devices are interconnected to each other by a bus 2108.

The memory 2102 includes, for example, ROM (read only memory) and RAM (random access memory), and it stores the programs to be used for processing. The CPU 2101 executes programs using the memory 2102 and performs necessary processing.

The patch information interpretation units 203 and 204, the patch data management unit 205 and the dynamic assignment management unit 206, shown in FIG. 2B, correspond to the function that is realized by executing the programs stored in the memory 2102. Also, the customer-used software list 212, the dynamic assignment table 213, the updating application table 214, shown in FIG. 2B, and the patch information interpretation comparison table 302 in FIG. 3 correspond to the data stored in the memory 2102.

The input device 2103 is, for example, a keyboard, a pointing device, and a touch panel, and is used to input instructions or information by an operator. The output device 2104 is, for example, a display, a printer, and a speaker, and is used to output queries to an operator and processing results.

The external storage device 2105 is, for example, a magnetic disk device, an optical disk device, a magnet-optic disk, and a tape device. The information processing apparatus stores the programs and data in this external storage device 2105, and uses the programs and data by loading them to the memory 2102 if necessary. The external storage device 2105 is also used as the database 211 shown in FIG. 2B.

The medium driving device 2106 drives a portable recording medium 2109, and accesses the contents recorded in the portable recording medium 2109. The portable recording medium 2109 is a computer readable recording medium such as a memory card, a flexible disk, CD-ROM (compact disk read only memory), an optical disk, and a magnet-optic disk. An operator stores the programs and data in this portable recording medium 2109, and uses the programs and data by loading them in the memory 2102 if necessary.

The network connection device 2107 is connected to any arbitrary communication network such as a LAN (local area network) to perform data conversion required for communications. The information processing apparatus receives the programs and data from external apparatuses via the network connection device 2107 and uses the programs and data by loading them to the memory 2102, if necessary. The network connection device 2107 is also used to receive patch information and patch data.

Figure 22:
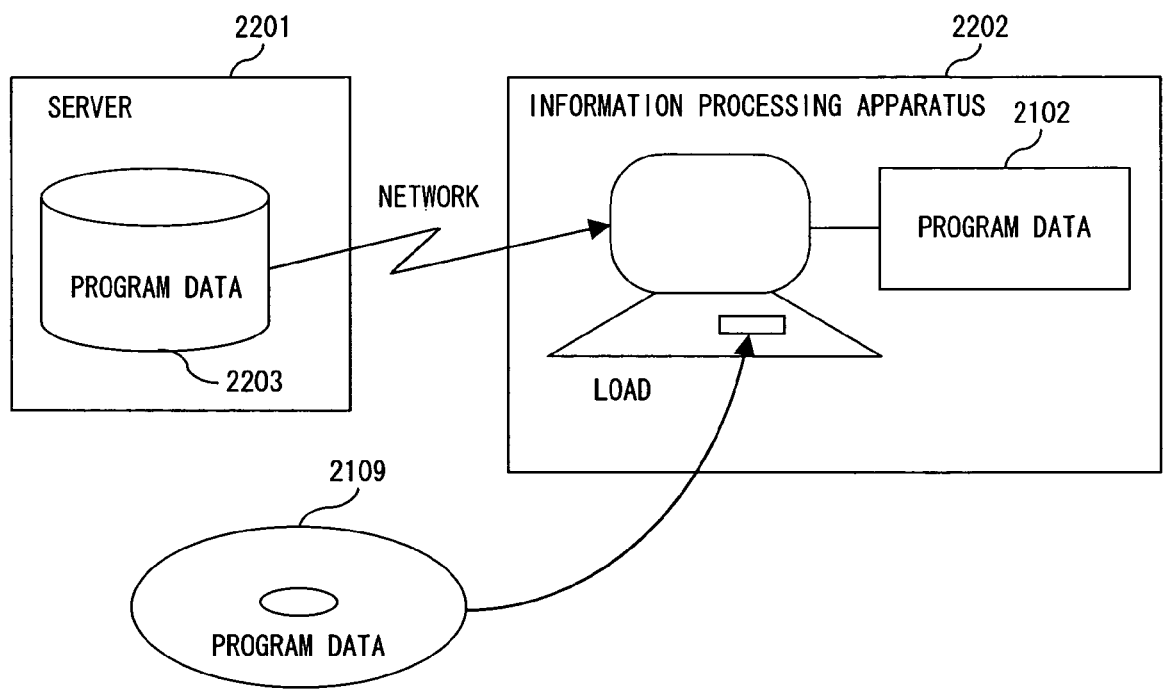
FIG. 22 shows a recording medium.

FIG. 22 shows a computer readable recording medium that can supply programs and data to the information processing apparatus shown in FIG. 21. The programs and data stored in the portable recording medium 2109 and the server 2201 are loaded to the memory 2102 of the information processing apparatus 2202. The CPU 2101 executes the programs using the data and performs necessary processing.

If the present invention is applied to a data center which deals with a large number of customers, computer resources can be automatically kept in a clean condition without stopping the services that are in operation.

What is claimed is:

1. An apparatus connected to a plurality of servers through a network environment, for dynamically assigning each of the plurality of servers to one of a plurality of customers and applying revision information to software operating in respective servers, comprising:

a storage device storing management information indicating a correspondence of a name of target software of issued revision information, an issue date, an importance degree and a version of the issued revision information, a customer used software list indicating a correspondence of a customer name, a name of software that the customer uses and a restricting condition including a threshold designated by the customer, and a dynamic assignment table indicating a correspondence of a server name, a customer name, a name of installed software and a version;

a calculation device referring to the management information when new revision information is issued, calculating basic points corresponding to issue dates for respective versions of software corresponding to a name of target software of the new revision information, and calculating indexes of the respective versions by changing the obtained basic points according to importance degrees of the respective versions; and an application device referring to the customer used software list and obtaining the customer name and the restricting condition corresponding to the name of software matching the name of target software of the new revision information, referring to the dynamic assignment table and obtaining the customer name and the version corresponding to the name of installed software matching the name of target software of the new revision information, checking whether the calculated index for the obtained version satisfies the restricting condition for each customer name by comparing the calculated index with the threshold included in the obtained restricting condition, obtaining the server name corresponding to the name of installed software matching the name of target software of the new revision information if the calculated index does not satisfy the restricting condition, and applying the new revision information to the installed software operating in a server with the obtained server name to update the installed software.

2. A computer readable storage encoded with a program for a computer, connected to a plurality of servers through a network environment, to dynamically assign each of the plurality of servers to one of a plurality of customers and apply revision information to software operating in respective servers, the program, which when executed by a computer, causes the computer to perform a process comprising:

referring to management information indicating a correspondence of a name of target software of issued revision information, an issue date, an importance degree and a version of the issued revision information, when new revision information is issued, calculating basic points corresponding to issue dates for respective versions of software corresponding to the name of target software of the new revision information, and calculating indexes of the respective versions by changing the obtained basic points according to importance degrees of the respective versions;

referring to a customer used software list indicating a correspondence of a customer name, a name of software that the customer uses and a restricting condition including a threshold designated by the customer, obtaining, from the customer used software list, the customer name and the restricting condition corresponding to the name of software matching the name of target software of the new revision information, referring to a dynamic assignment table indicating a correspondence of a server name, a customer name, a name of installed software and a version, obtaining, from the dynamic assignment table, the customer name and the version corresponding to the name of installed software matching the name of target software of the new revision information, checking whether the calculated index for the obtained version satisfies the restricting condition for each customer name by comparing the calculated index with the threshold included in the obtained restricting condition; and obtaining the server name corresponding to the name of installed software matching the name of target software of the new revision information if the calculated index does not satisfy the restricting condition, and applying the new revision information to the installed software operating in a server with the obtained server name to update the installed software.

3. The computer readable storage according to claim 2, the process further comprising preparing a same software configuration as that of the server with the obtained server name in an unused server that has not been assigned to any customer yet, applying the new revision information to the installed software included in the software configuration in the unused server, and assigning the unused server instead of the server with the obtained server name to the customer in order to update the installed software.

4. The computer readable storage according to claim 2, wherein the program applies the new revision information to update the software that has not been assigned to any customer in an unused server that has not been assigned to any customer, and assigns the unused server to a customer, when the customer who requires that software appears.

5. The computer readable storage according to claim 2, wherein the program calculates the index for a version of the target software that the customer is using out of a plurality of versions of the target software to which the new revision information is applied, and applies the new revision information to said version of the target software if the index of the version of the target software that the customer is using does not satisfy the restricting condition.

6. A method for dynamically assigning each of a plurality of servers to one of a plurality of customers and applying revision information to software operating in respective servers, comprising:

referring to management information indicating a correspondence of a name of target software of issued revision information, an issue date, an importance degree and a version of the issued revision information, when new revision information is issued, calculating basic points corresponding to issue dates for respective versions of software corresponding to the name of target software of the new revision information, and calculating indexes of the respective versions by changing the obtained basic points according to importance degrees of the respective versions;

referring to a customer used software list indicating a correspondence of a customer name, a name of software that the customer uses and a restricting condition including a threshold designated by the customer, obtaining, from the customer used software list, the customer name and the restricting condition corresponding to the name of software matching the name of target software of the new revision information, referring to a dynamic assignment table indicating a correspondence of a server name, a customer name, a name of installed software and a version, obtaining, from the dynamic assignment table, the customer name and the version corresponding to the name of installed software matching the name of target software of the new revision information, checking whether the calculated index for the obtained version satisfies the restricting condition for each customer name by comparing the calculated index with the threshold included in the obtained restricting condition; and obtaining the server name corresponding to the name of installed software matching the name of target software of the new revision information if the calculated index does not satisfy the restricting condition, and applying the new revision information to the installed software operating in a server with the obtained server name to update the installed software.

7. An apparatus connected to a plurality of servers through a network environment, for dynamically assigning each of the plurality of servers to one of a plurality of customers and applying revision information to software operating in respective servers, comprising:

storage means for storing management information indicating a correspondence of a name of target software of issued revision information, an issue date, an importance degree and a version of the issued revision information, a customer used software list indicating a correspondence of a customer name, a name of software that the customer uses and a restricting condition including a threshold designated by the customer, and a dynamic assignment table indicating a correspondence of a server name, a customer name, a name of installed software and a version;

calculation means for referring to the management information when new revision information is issued, calculating basic points corresponding to issue dates for respective versions of software corresponding to a name of target software of the new revision information, and calculating indexes of the respective versions by changing the obtained basic points according to importance degrees of the respective versions; and application means for referring to the customer used software list and obtaining the customer name and the restricting condition corresponding to the name of software matching the name of target software of the new revision information, referring to the dynamic assignment table and obtaining the customer name and the version corresponding to the name of installed software matching the name of target software of the new revision information, checking whether the calculated index for the obtained version satisfies the restricting condition for each customer name by comparing the calculated index with the threshold included in the obtained restricting condition, obtaining the server name corresponding to the name of installed software matching the name of target software of the new revision information if the calculated index does not satisfy the restricting condition, and applying the new revision information to the installed software operating in a server with the obtained server name to update the installed software.

\* \* \* \* \*